United States Patent [19]

Bondurant

[11] Patent Number: 4,646,581
[45] Date of Patent: Mar. 3, 1987

[54] INFINITELY VARIABLE RATIO TRANSMISSION

[76] Inventor: John C. Bondurant, 219 E. Clinton, Hickman, Ky. 42050

[21] Appl. No.: 734,901

[22] Filed: May 16, 1985

[51] Int. Cl.$^4$ ............................................. F16H 15/16
[52] U.S. Cl. ..................................................... 74/193
[58] Field of Search .................. 74/193, 191, 190, 198, 74/215

[56] References Cited

U.S. PATENT DOCUMENTS

| | | | |
|---|---|---|---|
| 1,128,460 | 2/1915 | Kubitz et al. | 74/193 |
| 1,317,915 | 10/1919 | Ford | 74/198 |
| 1,489,521 | 4/1924 | Conrad | 74/193 |
| 2,461,258 | 2/1949 | Brooks | 74/193 |
| 2,612,784 | 10/1952 | Patzak | 74/193 |
| 3,414,665 | 12/1968 | Parrish | 74/193 |
| 3,613,467 | 10/1971 | Lee | 74/215 |
| 3,698,255 | 10/1972 | Schott | 74/193 |
| 4,448,087 | 5/1984 | Barzel | 74/193 |

*Primary Examiner*—Allan D. Herrmann
*Attorney, Agent, or Firm*—Harvey B. Jacobson

[57] ABSTRACT

A mount is provided from which a pair of laterally spaced and registered oppositely tapering parallel cones are journaled. A cage is guidingly supported from the mount for adjusted shifting along and between parallel planes containing the adjacent sides of the cones and a spherical power transmission member is universally rollingly supported from the cage and includes diametrically opposite surface portions tightly frictionally rollingly engaged with opposing surfaces of the cones and adjustment structure is provided for shifting the cage lengthwise of the cones.

2 Claims, 3 Drawing Figures

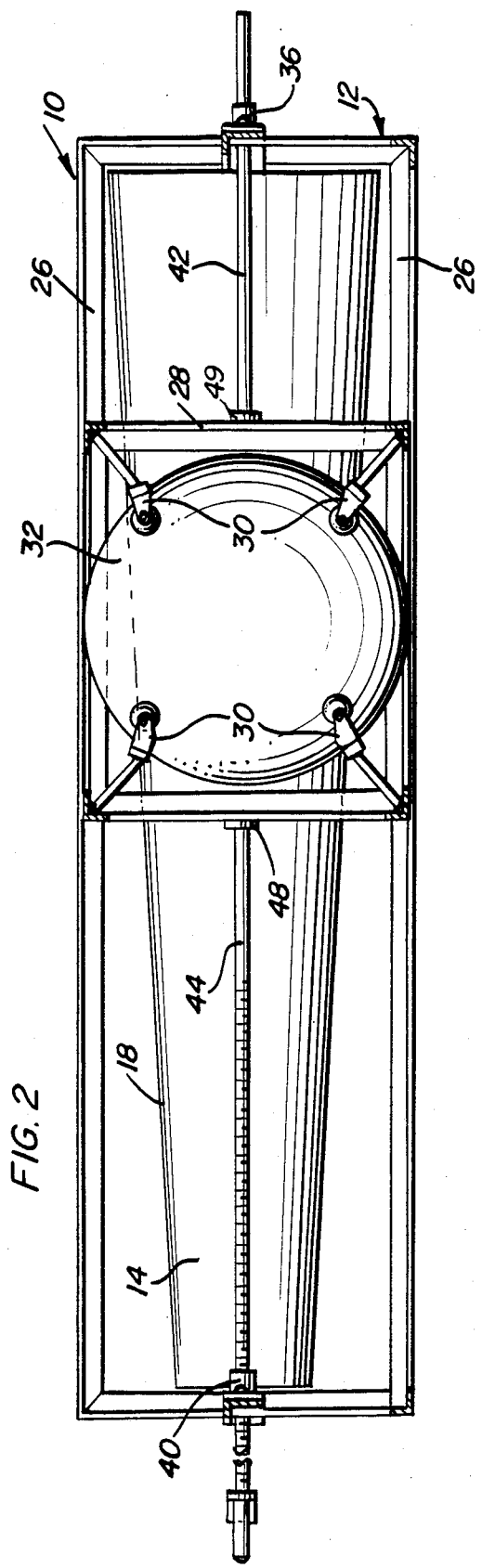
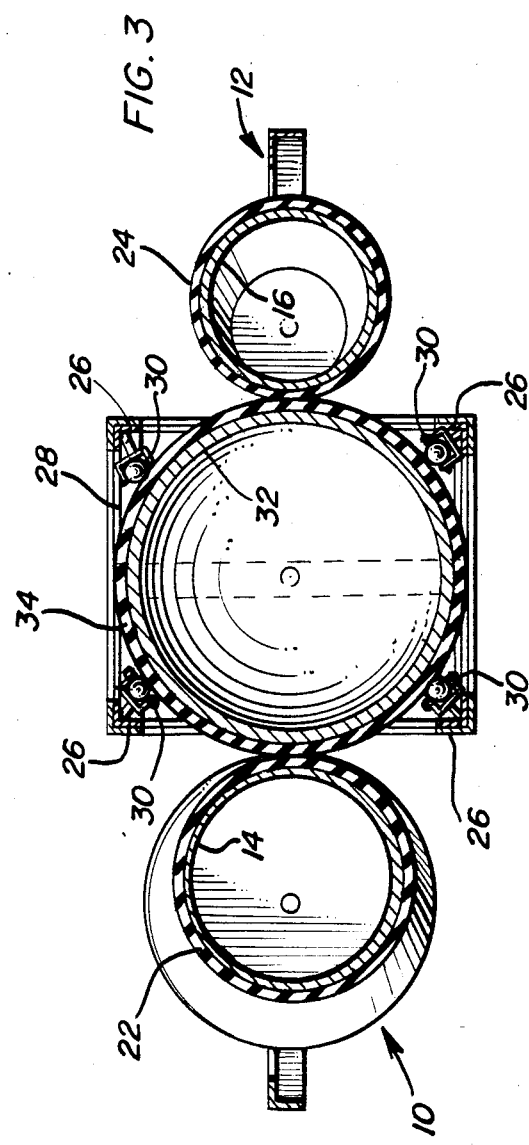

INFINITELY VARIABLE RATIO TRANSMISSION

BACKGROUND OF THE INVENTION

1. Field of the Invention

This invention relates to an infinitely variable ratio transmission utilizing a pair of oppositely tapered and laterally spaced and registered journaled cones between which a spherical power transfer member is disposed. The power transfer member is universally journaled from a supportive cage shiftable along the length of the cones and opposite peripheral portions of the spherical power transfer member are disposed in rolling friction contact with opposing surfaces of the cones.

2. Description of Related Art

A similar transmission incorporating oppositely tapered cones is disclosed in my prior U.S. Pat. No. 3,021,717, but utilizes an endless power transmission belt trained about the cones and having means operatively associated therewith for shifting the endless belt along the length of the cones to effect the desired ratio change.

SUMMARY OF THE INVENTION

The variable ratio transmission of the instant invention has been designed to incorporate simple mechanical elements and with those elements operatively associated with each other in a manner to provide an infinitely variable ratio transmission which may be readily operated by even inexperienced persons.

The main object of this invention is to provide an infinitely variable ratio transmission usable in various working environments.

Another object of this invention is to provide a transmission of the infinitely variable speed ratio type and incorporating simple operating components.

Still another object of this invention is to provide an infinitely variable ratio transmission which may be readily actuated from a remote location.

A final object of this invention to be specifically enumerated herein is to provide a variable ration transmission in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a longitudinal sectional view taken substantially upon the plane indicated by the section line 2—2 of FIG. 1;

FIG. 3 is a transverse sectional view taken substantially upon the plane indicated by the sectional line 3—3 of FIG. 1.

DESCRIPTION OF THE PREFERRED EMBODIMENT

Figure 1:
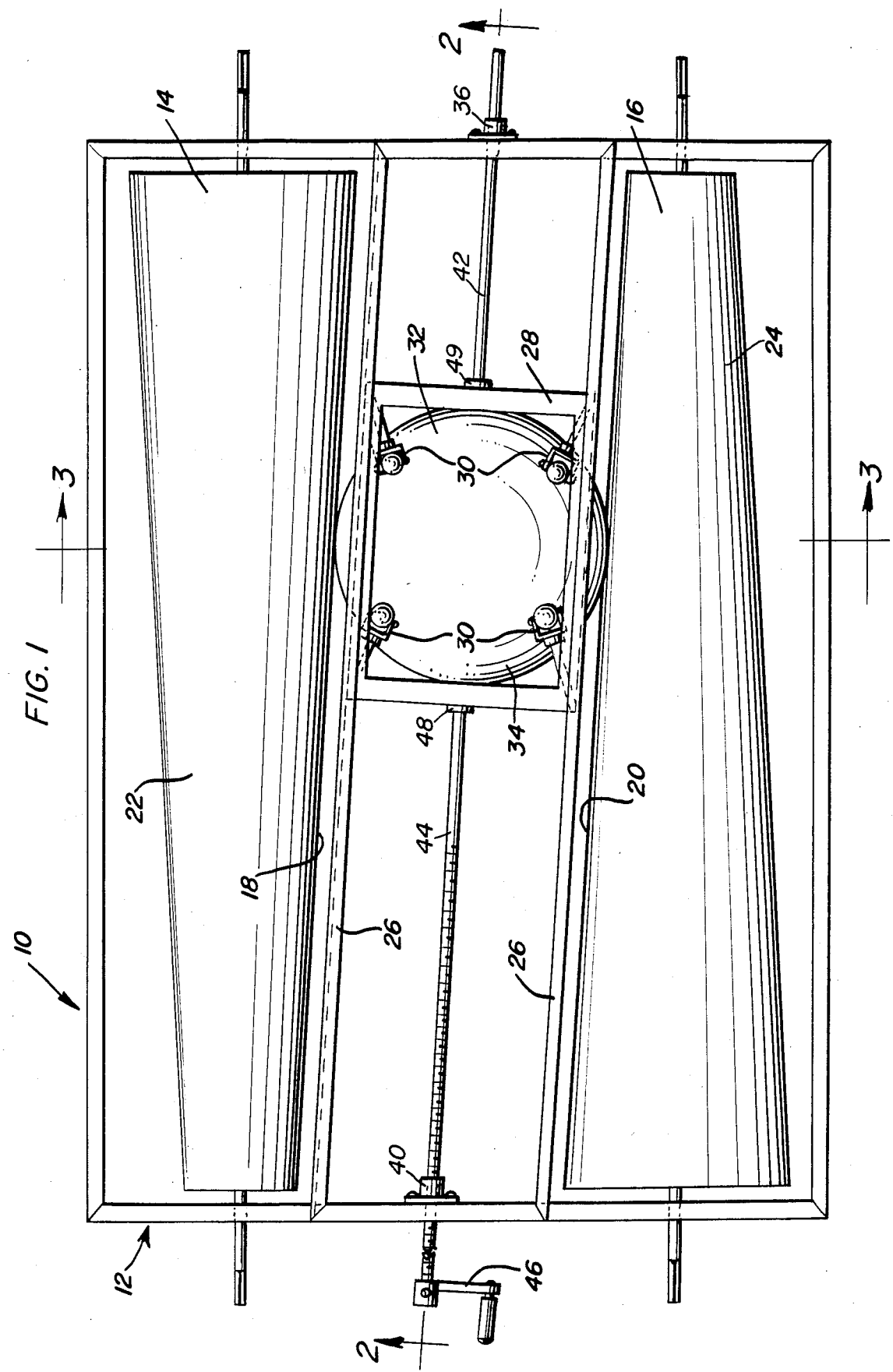
FIG. 1 is a side elevational view of the transmission of the instant invention.

Referring now more specifically to the drawings the numeral 10 generally designates the variable ratio transmission of the instant invention. the transmission 10 includes a frame, or housing referred to in general by the reference numeral 12 from which apair of laterally spaced parallel power input and power output cones 14 and 16 are journaled. The cones 14 and 16 are of the same taper and include parallel opposing sides 18 and 20. The cones are hollow (although they may be of solid construction) and include outer cone shaped coverings 22 and 24.

The frame or housing 12 includes four longitudinally extending angle members 26 extending and secured between the opposite ends of the frame, mount or housing 12 and a rectangular skeletal cage 28 is slidably mounted from the angle members 26 for guided movement longitudinally of the frame 12.

The cage 28 includes a parallepiped frame incorporating eight caster wheel assemblies 30 supported from the corner portions thereof and a spherical power transfer member 32 is universally journaled, or rollingly supported, from the caster wheel assemblies 30 of the cage 28. The power transfer member 32 is also hollow, but may be of solid construction, and includes a resilient outer coating 34.

One end of the frame, mount or housing 12 includes a sleeve bearing 36 supported therefrom and the other end of the frame or housing 12 includes an internally threaded nut 40 supported therefrom. A smooth shaft 42 is supported from and projects outwardly from one end of the cage 28 and is slidably received through the sleeve bearing 36. In addition, a threaded shaft 44 has one end captively journalled from the other end of the cage 28 and is threadedly received through the nut 40 and has a crank 46 mounted on its free end.

The end of the shaft 44 adjacent the cage 28 is journaled from the cage 28 as at 48 against axial shifting relative thereto as at 49. The end of the shaft 42 adjacent the cage 28 may be fixedly mounted therefrom.

Upon rotation of the crank 46 the shaft 44 will be rotated and the cage 28 will be shifted longitudinally of the mount 12. Diametrically opposite portions of the covering 34 on the power transfer member 32 are tightly rollingly engaged with the opposing outer surfaces of the resilient coverings 22 and 24 of the cones 14 and 16. Accordingly, upon the input of rotary torque to the cone 14, the power transfer member 32 will be rotated and the latter will in turn cause rotation of the cone 16. The position of the cage 28 and the power transfer member 32 longitudinally of the mount 12 will determine the drive ratio at which the cone 16 is driven from the cone 14. Obviously, the cone 16 may be driven at a speed comprising a fraction of the speed of the cone 14 or at a speed comprising a multiple of the speed of rotation of the cone 14.

Although the shaft 44 has the crank 46 mounted thereon, the shaft 44 may be rotated from a remote location through a flexible drive shaft. In addition, any suitable mechanism (not shown) may be used to control rotation of the shaft 44 and the positioning of the cage 28 along the frame 12 responsive to the rotational load to which the cone 16 is drivingly connected.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An infinitely variable ratio transmission including a mount, a pair of laterally spaced and registered cones journaled from said mount about substantially parallel axes and including adjacent peripheral portions disposed in substantially parallel planes, a cage, means guidingly supporting said cage from said mount for movement along said planes, a single spherical power transmission member universally journaled from said cage and including precisely diametrically opposite surface areas disposed in rolling frictional engagement with the outer surfaces of said cones, and means operative to adjustably shift said cage along said planes and said adjacnet surfaces of said cones, said cage including a generally parallelepiped frame, said spherical power transmission member being disposed within said cage, said cage including eight caster wheel assemblies supported from the eight corners thereof universally rollingly supporting said spherical power transmission member within said cage, said power transmission member including a resilient outer friction coating and said cones each including a resilient outer friction coating.

2. The transmission of claim 1 wherein said means operative to shift said cage along said planes includes screw jack means operatively connected between said mount and said cage.

* * * * *